United States Patent [19]

Ritchie

[11] 4,135,240

[45] Jan. 16, 1979

[54] PROTECTION OF DATA FILE CONTENTS

[75] Inventor: Dennis M. Ritchie, Summit, N.J.

[73] Assignee: Bell Telephone Laboratories, Incorporated, Murray Hill, N.J.

[21] Appl. No.: 377,591

[22] Filed: Jul. 9, 1973

[51] Int. Cl.² .................... G06F 11/10; G06F 13/00
[52] U.S. Cl. ................................................ 364/200
[58] Field of Search .......................... 340/172.5; 364/200 MS File, 900 MS File

[56] References Cited

U.S. PATENT DOCUMENTS

| Re. 27,239 | 11/1971 | Ulrich | 340/172.5 |
|---|---|---|---|
| Re. 27,251 | 12/1971 | Amdahl et al. | 340/172.5 |
| 3,368,207 | 2/1968 | Beausoleil et al. | 340/172.5 |
| 3,377,624 | 4/1968 | Nelson et al. | 340/172.5 |
| 3,469,239 | 9/1969 | Richmond | 340/172.5 |
| 3,576,544 | 4/1971 | Cordero et al. | 340/172.5 |
| 3,599,159 | 8/1971 | Creech et al. | 340/172.5 |
| 3,631,405 | 12/1971 | Hoff | 364/200 |
| 3,683,418 | 8/1972 | Martin | 340/172.5 |
| 3,735,364 | 5/1973 | Hatta | 340/172.5 |
| 3,742,458 | 6/1973 | Inoue et al. | 340/172.5 |
| 3,761,883 | 9/1973 | Alvarez | 364/200 |

*Primary Examiner*—James D. Thomas
*Attorney, Agent, or Firm*—Stephen J. Phillips

[57] ABSTRACT

An improved arrangement for controlling access to data files by computer users. Access permission bits are used in the prior art to separately indicate permissions for the file owner and nonowners to read, write and execute the file contents. An additional access control bit is added to each executable file. When this bit is set to one, the identification of the current user is changed to that of the owner of the executable file. The program in the executable file then has access to all data files owned by the same owner. This change is temporary, the proper identification being restored when the program is terminated.

4 Claims, 2 Drawing Figures

PROTECTION OF DATA FILE CONTENTS

BACKGROUND OF THE INVENTION

1. Field of the Invention

This invention relates to computer systems, and more particularly, to computer systems having multiple users and multiple data files.

2. Description of the Prior Art

Computer systems are more efficiently operated when there are multiple users, and file storage devices are more efficiently used when many users share storage space on the same physical device. Each user then has the potential for accessing files belonging to other users. Free access is not generally permissable since files may contain programs or data of sensitive nature.

Virtually all computer systems provide means for protecting sensitive files against access by users legitimately present in the computer system but not authorized to use all files. Hardware or software control mechanisms are provided to decide at the time of a user request for file access whether access permission is to be granted or denied. In general the information necessary for this decision are (1) file identity (2) user identity and (3) access purpose.

Computer systems have been designed which include elaborate lists identifying which users are permitted to access which files for which purposes. The result is a complex internal bookeeping task. As users share programs and data, the lists of permitted functions must be interchanged. See the article "Dynamic Protection Structures" by B. W. Lampson, *AFIPS Fall Joint Computer Conference*, 1969, pp. 27-38. The scheme described by Lampson solves the access permission problem in a general way, but the result is so complex that it has not found wide acceptance in the computer field.

This improvement is addressed to the simpler schemes which are in wide use. Each user of the computer system is preassigned an identification number (user ID). Whenever a user creates a file by reserving file space for his own use, his user ID is stored along with the file to identify the file owner (owner ID). In creating the file, the owner also specifies certain permissions which are to be granted or denied to himself as owner, and to everyone else as nonowners. Generally, these permissions are for reading and for writing the file. This information may be contained in as few as four binary digits or "permission bits," a modest addition to each stored file. Also, in systems having a common format for files containing programs and files containing data, it is usual to have permission information to indicate that the file contents may or may not be loaded into the computer and executed as a program. This may comprise an additional execute permission bit, or an additional two bits, separate permissions for owners and nonowners.

The described scheme takes into account file identity because access control information is stored in association with each file individually. User identity is taken into account in a gross but useful distinction between owner and nonowner. Access purpose is also a factor because of the coarse selection between reading, writing and execution permissions.

A shortcoming with this scheme is its lack of ability to include fine distinctions of access purpose. Consider, for example, the problem of accessing a computer time usage accounting data file. Such a file is used by computer time accounting programs to store elapsed time of computer usage by the various users of the system. The accounting programs and the accounting files are owned by the same user who has permission to read and write the accounting file to permit regular updates. Suppose now that it is desired to permit each user to read from the accounting file the information associated with that user's own computer usage. This is certainly a legitimate access purpose so long as the user does not attempt to read other accounting information which is considered private as far as he is concerned.

Under the described scheme there is no simple way to permit this kind of special purpose data file access. A general user wishing to read the accounting file cannot do so directly because he will not have nonowner permission to read. He cannot execute the general accounting programs to read for him and return the information because he will not have nonowner permission to execute the general accounting programs. Such permissions must generally be denied to nonowners to assure privacy of the accounting file contents. This problem is further described in the article "MOO in Multics" by J. M. Grochow, Software - Practice and Experience, Vol. 2, pp. 303-308 (1972).

SUMMARY OF THE INVENTION

The present invention adds a facility to the basic protection scheme just described which permits computer users to access a data file for any specific purpose. This is done by providing for the execution of a computer program to access the file, which program is supplied by the file owner and thus can impose any degree of control which the file owner wishes to include. This new facility uses an additional file access control bit for each stored file of executable program. This additional bit is termed the "set user identification bit" (SUID bit).

The user ID which is stored by the computer and is effective to control subsequent file access is changed whenever a stored file containing an executable program (executable file) is loaded into computer memory for execution and whenever the associated SUID bit is set to one. The effective user ID is changed from that of the actual user to that of the owner of the executable file. During the execution of the program, therefore, the current user appears to be the owner of the executable file and all of the data files accessible to the owner of the executable file are available to the program. The user may request the program to access those data files, and the program will operate to satisfy that access request in the manner it was designed to do, making whatever tests and restricting access in any manner intended by the program designer, the actual owner of the executable file and the data files. For the duration of the program execution the change in user ID is effective. When the program is terminated, as for example the attempted execution of a new program, the user ID of the actual user is restored.

Under this improved scheme, the problem of accounting file access is easily solved. The computer user who owns the accounting programs and accounting file provides a special program for nonaccounting users which reads the accounting file. This special program reads the user ID of the actual current user and compares this with the user ID for the accounting file record sought to be read. If they match, the information concerns the requesting user and can therefore be returned to him. This special program is stored in a file which has nonowner permission for execution, and which has the SUID bit set to one.

When the general user executes the special program, the SUID bit causes the effective user ID to be changed to the owner ID of the special program, the accounting user ID. Thus, during the execution of the special program, access to the accounting files is allowed by the owner permission bits of the accounting file. Now the user requests the special program to read the accounting file. The special program has the proper permission, but the action of the special program is determined by the accounting user who designed the special program. The special program therefore reads the actual user ID of the requesting user and only returns to him the accounting information from the accounting file which relates to himself. The general user can therefore access the accounting files only for the specific bona fide purpose for which the special program was provided by the accounting user. After the execution of the special program is terminated, the effective user ID is restored to the user ID of the actual user.

The accounting file access problem is exemplary of the type of problem this new facility alleviates. Other applications will become apparent from the following description of one embodiment of the invention.

BRIEF DESCRIPTION OF THE DRAWING

Taken together,

FIG. 1a illustrates a plurality of files stored in a computer storage device, having access control information associated therewith;

FIG. 1b illustrates a digital computer and its memory which operate in conjunction with the files stored in the previous Figure to embody the present invention.

DETAILED DESCRIPTION

Figure 1A:
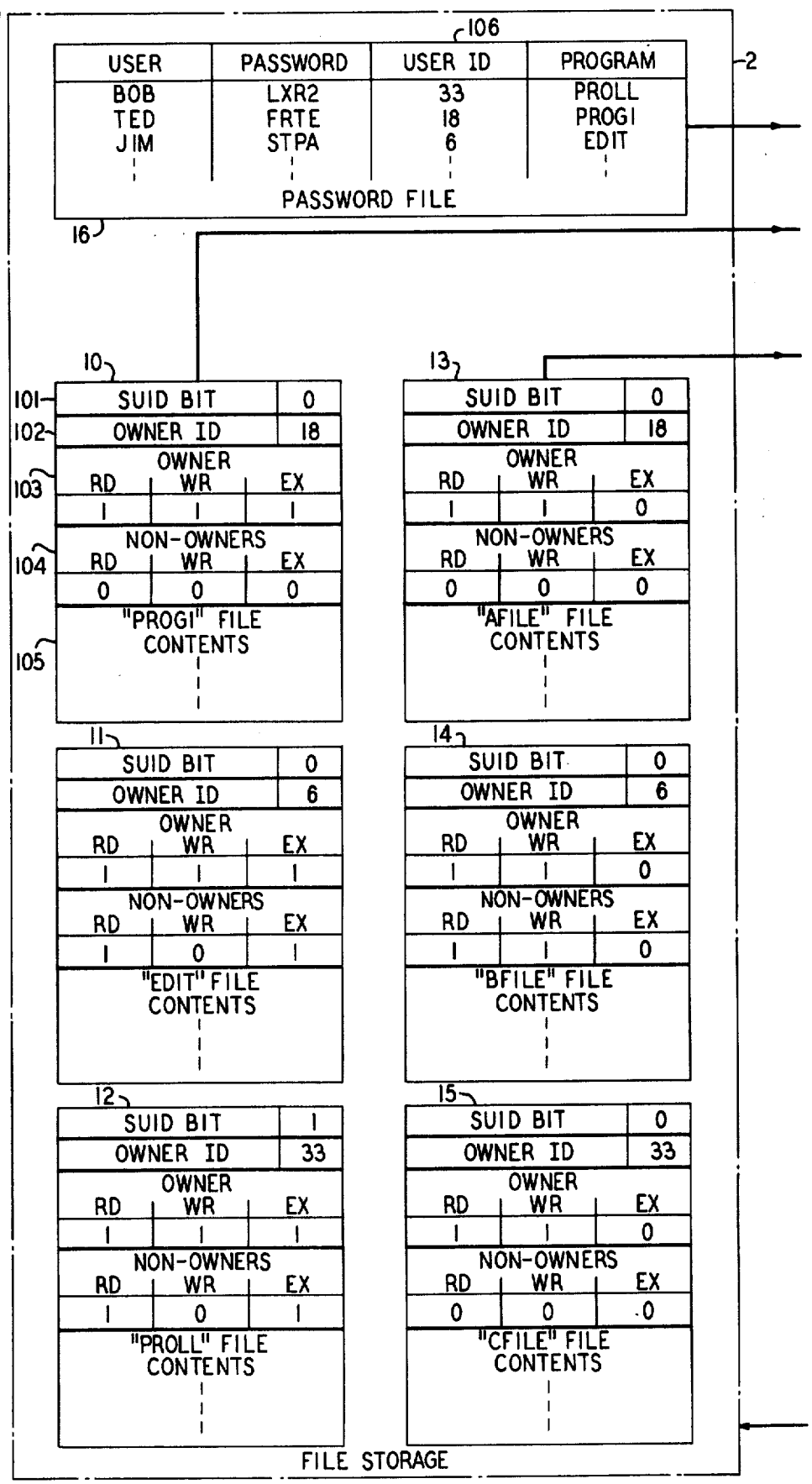
FIGS. 1a and 1b comprise a single Figure showing a computer system embodying the present invention.
Figure 1B:
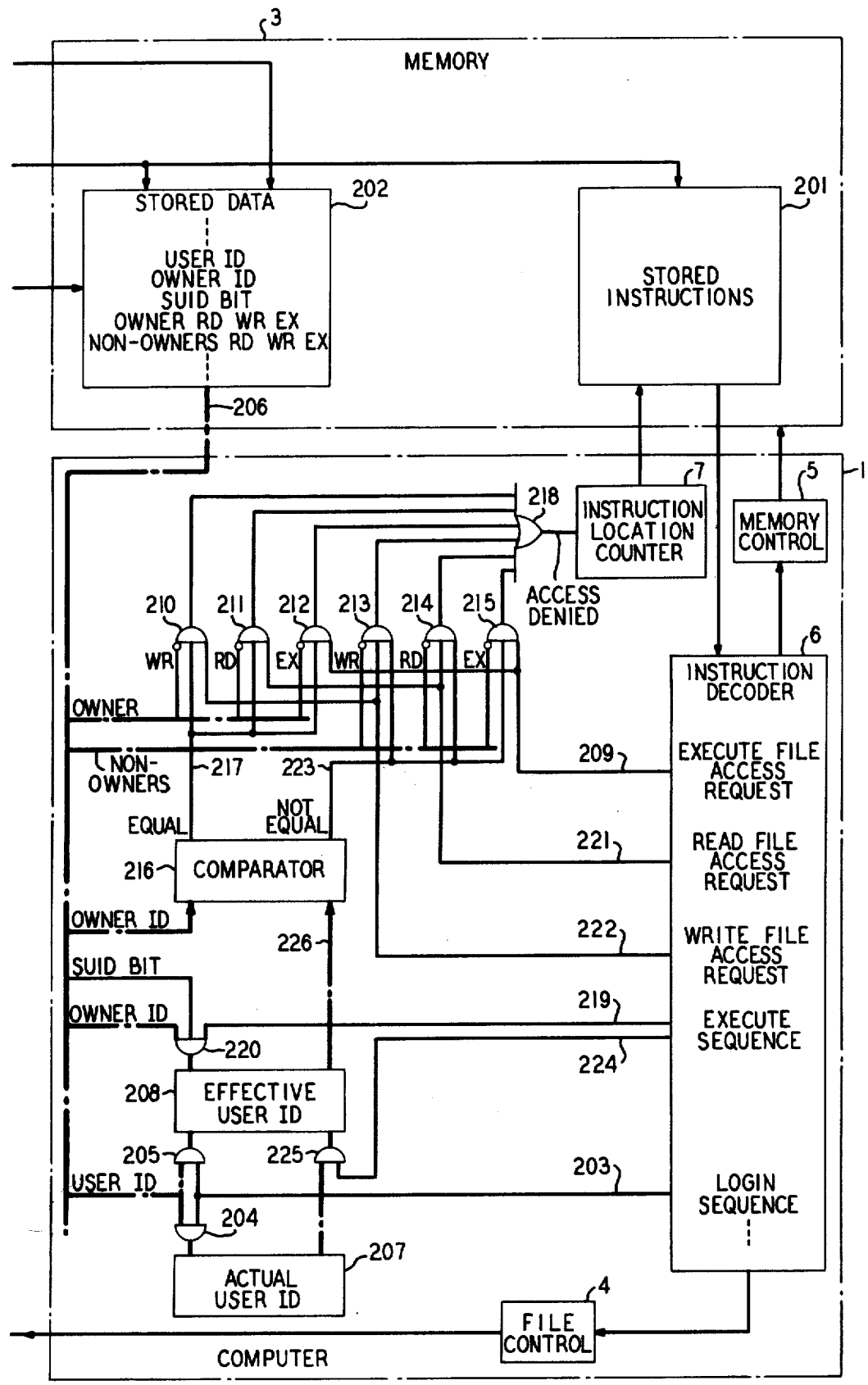

The drawing shows in a single Figure (comprising FIGS. 1a and 1b together) a computer system comprising computer 1 which accesses file storage 2 by means of file control 4 and accesses memory 3 by means of memory control 5. Files 10, 11, and 12 contain stored program information and are read from file storage 2 into memory 3 for execution by computer 1. Files 13, 14, 15 and 16 contain stored data information and are read from file storage 2 into memory 3 in order that the stored data contents may be accessed. Computer 1 is controlled, for the most part, by instructions read from memory 3 and executed by instruction decoder 6. Instruction location counter 7 controls the location within memory 3 of the stored instruction to be next executed by computer 1.

In computer systems, it is common practice to refer to files of programs or data by means of arbitrarily chosen symbolic reference names. In keeping with this practice files 10 through 16 will hereinafter be referred to by such symbolic names as they appear in the Figure, e.g., PROG1, EDIT, PROLL, AFILE, BFILE, CFILE and PASSWORD, respectively. For convenience, these names will also be used to denote program or data contents of the respective files as well as the files themselves. Thus PROG1 will be used to refer to file 10 as it appears in file storage 2 and also to the program contained in file PROG1 after being read into memory 3 for execution by computer 1.

As will become apparent the program PROG1 regularly accesses the data AFILE, the program EDIT regularly accesses data BFILE and the program PROLL regularly accesses data CFILE. Each of these six files has associated with them various access control information including: set user identification bit 101 (SUID bit), owner identification number 102 (owner ID) owner permission bits 103 and nonowner permission bits 104. This information controls access to stored file contents 105 in a manner to be described.

Each user of the computer system is identified by a unique preassigned user identification number 106 (user ID) which is retained in the PASSWORD file and which is retrieved when the user begins requesting computer services. A user may create a new file to contain data or program by reserving space in file storage 2 for that purpose. The owner ID of the new file is then set to be equal to the user ID of the creating user. Thus, the creating user is identified as the owner of the file. When the new file is thereafter to be accessed, the owner ID is compared with the user ID of the requesting user. If they match, owner permission bits 103 control file usage; if they do not match, nonowner permission bits 104 are used. Permission bits 103 and 104 are set to values prescribed by the owner when the file is created.

There are three permission bits each for owners and nonowners labeled RD, WR and EX in the Figure corresponding to read, write and execute permission, respectively. When a permission bit is set to 1, the associated function is permitted; when set to 0, the function is denied.

In the Figure read, write and execute permission, are granted for the respective owners of PROG1, EDIT, and PROLL. Thus user "TED" with user ID equal to 18 in the PASSWORD file is permitted to read from the contents of the PROG1 file, write into the PROG1 file, and load the contents of the PROG1 file for execution as a program. Similarly, AFILE, BFILE and CFILE have permission for reading and writing by their respective owners. Execution permission is denied to both owners and nonowners of AFILE, BFILE and CFILE since these files contain data and now executable program instructions.

In the Figure all nonowner permissions are denied for PROG1 and AFILE. Thus only user "TED", the owner of PROG1 and AFILE, may access them. If user "TED" executes PROG1, and if PROG1 contains appropriate read and write instructions, PROG1 would be capable of reading and writing AFILE. PROG1 could therefore represent a program written by user "TED" for maintaining AFILE as a file of private data.

Nonowners are permitted to read and execute EDIT, but not write into the EDIT file. EDIT could therefore represent a program provided by user "JIM" its owner, for public use but with a restriction upon its alteration by any user other than its owner. This prevents unauthorized changes from being made in the EDIT program. Nonowners of BFILE are granted both read and write permission making it universally available. BFILE may be a temporary storage file available to any user.

PROLL has nonowner permission bits similar to EDIT, making PROLL similarly publicly usable but privately alterable only by user "BOB," its owner. CFILE has no permissions granted for nonowners.

In the Figure, each file has associated with it an additional file access control bit, the set user identification bit (SUID bit). When the SUID bit is set to zero for a given file, the effect of the various permission bits is exactly that which has been so far described; owners and nonowners are identified by reference to their user ID as found in the password file, and users who are nonowners of a given file are subject to a set of permission bits which are distinct from users who are owners. Thus user "TED," user ID 18, may execute PROG1 (owner permission). PROG1 may then access AFILE for reading and writing (owner permissions). User "TED" may also call for the execution of EDIT (nonowner permission) and EDIT may then access AFILE for reading and writing since the current user of EDIT is also the owner of AFILE (owner permissions). EDIT could not access CFILE under these circumstances since user "TED" does not have nonowner permissions.

When the SUID bit is set to one for a given executable file, the effective user ID is temporarily altered to be the owner ID of the executable file during the period of its execution. Access to any files owned by the owner of the executable file is therefore controlled by owner permissions. In the Figure, user "TED" may execute PROLL (nonowner permission). PROLL has the SUID bit set to one, so that during the execution of PROLL the effective user ID of user "TED" is changed from 18 to the owner ID of PROLL which is 33. User "TED" thus has access to CFILE for reading and writing (owner permissions) during the execution of PROLL. After PROLL is terminated, the effective user ID of user "TED" reverts to the proper value of 18. Thus PROLL may represent a program provided by user "BOB", the owner of PROLL and CFILE, for the specific purpose of accessing CFILE on behalf of nonowners. The manipulations on CFILE performed by PROLL is under the control of user "BOB", the owner and presumably the designer of PROLL, so that nonowners can only access CFILE through PROLL for the bona fide purposes and in the manner which PROLL is designed to permit.

The SUID bit only has meaning when the file associated with it is loaded for execution as a computer program. For files containing only data and not executable program instructions, the SUID bit has no effect. In the Figure, the SUID bit is shown set to zero for data files AFILE, BFILE, and CFILE.

So far this Detailed Description has described the file access control information associated with each stored file, and the function of each piece of information in regulating access to the associated file. It remains now to complete this Detailed Description by illustrating an implementation giving concrete form to this functional description. To those skilled in the computer art it is obvious that such an implementation can be expressed either in terms of a computer program (software) implementation or a computer circuitry (hardware) implementation, the two being functional equivalents of one another. It will be understood that a functionally equivalent software embodiment is within the scope of the inventive contribution herein described. For some purposes a software embodiment may likely be preferrable in practice. When the construction of one such embodiment is given the other is well within the level of ordinary skill of those versed in digital computer techniques.

The circuitry shown in the Figure controls file access in the following manner. Computer 1 operates under control of program instructions stored in memory area 201. Instruction location counter 7 addresses each instruction to be executed. When the executing program calls for access to a stored file, the file access control information of the stored file, such as that shown at 101 through 104 for file PROG1 is read into memory area 202. The access control information is conveyed over cable 206 to various circuits of computer 1. Similarly, the contents of the PASSWORD file are read into memory area 202 and the user ID information stored therein also conveyed over cable 206.

Access to a given file is controlled by comparator 216, gate circuits 210 through 215 and gate circuit 218. The owner ID of the file to be accessed is conveyed to comparator 216 by cable 206. The effective user ID is conveyed from register 208 to comparator 216 by cable 226. In the event the owner ID and effective user ID are equal, comparator 216 provides an output on lead 217 to gate circuits 210, 211, and 212. In the event the owner ID and effective user ID are unequal, an output is provided on lead 223 to gate circuits 213, 214, and 215. When the instruction being executed by computer 1 requests file access for execution, instruction decoder 6 provides an output on lead 209 which is conveyed to gate circuits 212 and 215. When a read access request is made, an output is provided on lead 221 which is conveyed to gate circuits 211 and 214. When a write access request is made, an output is provided on lead 222 which is conveyed to gate circuits 210 and 213.

When permission bits of the file to be accessed are set to one, signals are provided over cable 206. Owner permissions to write, read and execute are conveyed to gate circuits 210, 211 and 212, respectively. Nonowner permissions to write, read and execute are conveyed to gate circuits 213, 214 and 215, respectively. When any of the respective permission bits are set to one, the corresponding gate circuits 210 through 215 are prevented from producing an output. When any of the respective permission bits are set to zero, the corresponding gate circuits 210 through 215 are enabled for operating on the coincidence of signals from the corresponding inputs from comparator 216 and instruction decoder 6.

When any one or more of the gate circuits 210 through 215 produces an output, gate circuit 218 produces an output which is conveyed to instruction location counter 7 to deny the access permission requested by instruction decoder 6. An output from gate circuit 218 causes instruction location counter 7 to alter the normal sequence of program execution by computer 1. Instead of continuing with the program sequence which completes the process of accessing the file for reading, writing or execution, computer 1 begins executing a sequence which notifies the requesting program that access is denied. In the absence of a signal from gate circuit 218 instruction location counter 7 proceeds in the normal manner causing computer 1 to continue to the next instruction in the program sequence to access the file as requested.

As each computer user begins requesting computer services, the program first executed on his behalf is the program whose name appears in the PASSWORD file under the entry for that user. The process of beginning operation with the computer is termed "logging in", a term which reflects the entry of the new user into various internal tables. The sequence of program instructions which enters new users into the main stream of computer activities is termed the LOGIN sequence.

Once having logged into the computer, the user may call for the execution of any other program stored in the files by invoking a program sequence for accessing the file, reading it in, and beginning its execution. This is termed the EXECUTE sequence. Access to an executable program file is controlled by the associated owner and nonowner permission bits.

During the LOGIN sequence, the contents of the PASSWORD file is read into memory area 202. The user is required to input to the computer his user name and his private password. The appropriate user entry is located in the PASSWORD file and the password checked to verify the authenticity of the user service request. If the user is bona fide, instruction decoder 6 transmits a control pulse in response to the LOGIN sequence over lead 203 to gating circuits 204 and 205. Thus user ID of the new user, conveyed from memory 3 via cable 206, is gated into registers 207 and 208 where it is stored. Register 207 contains the actual user ID of the current system user as obtained from the PASSWORD file. Register 208 contains the user ID which will be effective to control file access. The contents of register 208 may be changed at times other than during LOGIN.

The LOGIN sequence of instructions also obtains from the PASSWORD file the identity of the program to be executed on behalf of the new user. The LOGIN sequence terminates by calling for the EXECUTE sequence to begin execution of the named program.

During the EXECUTE sequence, instruction decoder 6 transmits a control pulse over lead 224 to gate circuit 225. The contents of register 207 is thereby gated into register 208. This resets the effective user ID to the value of the current actual user ID cancelling the effect of any temporary alteration in the contents of register 208 made by the previously executing program.

The EXECUTE sequence next calls for access to the named stored file for execution causing the appropriate file access control information to be read into memory area 202 and causing the appropriate owner or nonowner execution permission to be checked as previously described.

In response to the EXECUTE sequence, instruction decoder 6 next transmits a pulse over lead 219 to gate circuit 220. The SUID bit for the file to be executed is conveyed over cable 206 to gate circuit 220. If the SUID bit is zero for the file to be executed, gating circuit 220 is not enabled and the effective user ID stored in register 208 remains equal to the value of the actual user ID. If the SUID bit of the file to be executed is set to one, the coincidence of the SUID bit and the pulse on lead 219 enables gate circuit 220 to gate into register 208 the owner ID of the file to be executed. The owner ID is conveyed to gate circuit 220 over cable 206. The effective user ID stored in register 208 is thus set equal to the owner ID of the file to be executed when the SUID bit of the file to be executed is set to one.

The EXECUTE sequence terminates by reading the file contents of the file to be executed into memory area 201 and then transferring control to those instructions.

Any program in execution on computer 1 may call for read or write access to files in storage. When this occurs, the appropriate read or write permission bits are checked as above described. Either the owner or nonowner permission bits will be checked according to the owner ID of the file to be accessed and the effective user ID of the program in execution as stored in register 208. If the program in execution has the SUID bit of its file access control information set to one, the effective user ID is the same as the owner ID of the file containing the program in execution. In this case, access to any file having this same owner ID will be controlled by the owner permission bits. If the program in execution has the SUID bit of its file access control information set to zero, the effective user ID is the user ID of the actual user, and file access will be controlled by the owner or nonowner permission bits, depending on the owner ID of the file to be accessed.

Any program in execution on computer 1 may call for the execution of executable program files in storage. When this occurs, the effective user ID stored in register 208 is reset to the value of the actual user ID. Access to the executable file is controlled by the owner or nonowner permission bits, depending on the owner ID of the executable file to be accessed.

Details of circuit construction for the various circuit elements illustrated may be found in Chapter 9 of *Pulse, Digital, and Switching Waveforms* by Millman and Taub, McGraw-Hill, 1965, a standard text on the subject.

What is claimed is:

1. In a computer system serving at least one external current user and having stored at least one file of executable program instructions owned by a file owner different from said current user,
   means for storing access control information in association with said file, including identification of said file owner and a control indicator having selectively either a first or a second binary state,
   means for sensing said first state of said control indicator, and
   means responsive to said first state of said control indicator for changing temporarily the identification of said current user of the computer system to that of said file owner during the execution of said program instructions,
   whereby said current user selectively may be given access by said computer system to files owned by said file owner during the execution of said program instructions.

2. A computer system including file storage and memory for serving a multiplicity of external users, each user having a unique identification comprising:
   at least one file stored in said file storage containing program instructions and having associated therewith the identification of the owner of said file and a control signal having selectively either a first or a second binary state;
   means for storing the identification of the current user of said computer system;
   means for loading program instructions from said file into said memory for execution by said computer on behalf of said current user;
   means for detecting said first state of said control signal associated with said file;
   means responsive to said means for detecting for changing the identification of the current user to the identification of said owner of said file; and
   means for restoring the identification of the current user at the end of the execution of said program instructions;
   whereby the current user selectively may be given access by said computer system to files owned by said owner of said file during the execution of said program instructions.

3. A computer system having a multiplicity of stored files, each said file having associated a file owner identification, means for storing the identification of the external current user of the computer system, and means for accessing a data file including means for comparing the owner identification of said data file with the current user identification, for denying access if said identifications do not match, and for permitting access if said identifications do match, comprising:

at least a first stored file of executable program instructions and at least a second stored file of data, said first file having associated therewith a control indicator having selectively either a first or a second binary state, and said first and second files having the same file owner identification, means for loading the program instructions from said first stored file for execution by the computer system and for sensing said first state of said control indicator, and means for changing temporarily the identification of the current user to that of the owner of said first stored file in response to said first state of said control indicator, whereby said means for accessing selectively permits access to said second file of stored data during the execution of said program instructions.

4. A computer system as set forth in claim 3 further comprising means for storing the user identification of the actual current user of the computer system;

and, means responsive to said means for storing for changing back the identification of the current user from that of the owner of the first stored file to that of the actual current user after the execution of said program instructions.

* * * * *